United States Patent Office 3,697,346
Patented Oct. 10, 1972

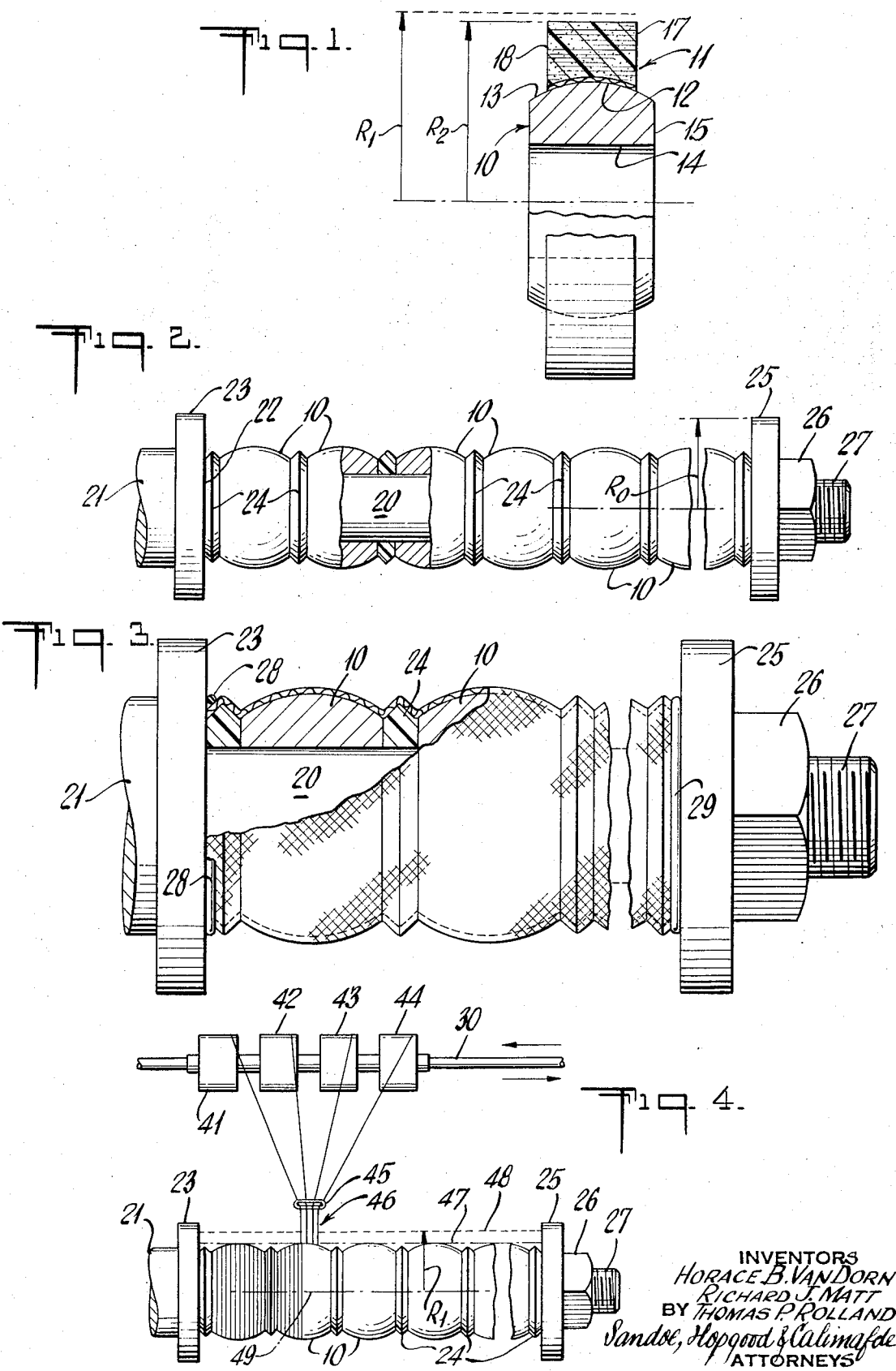

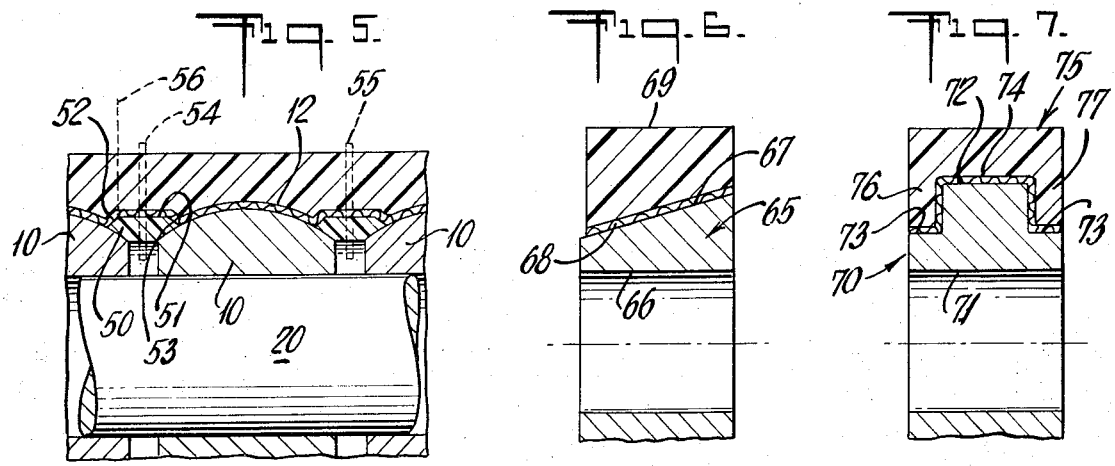
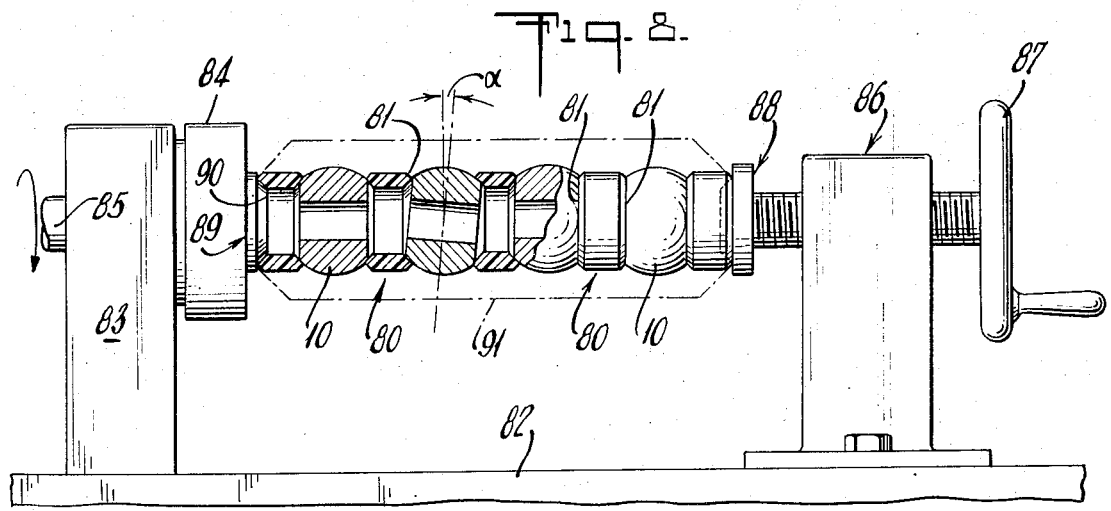
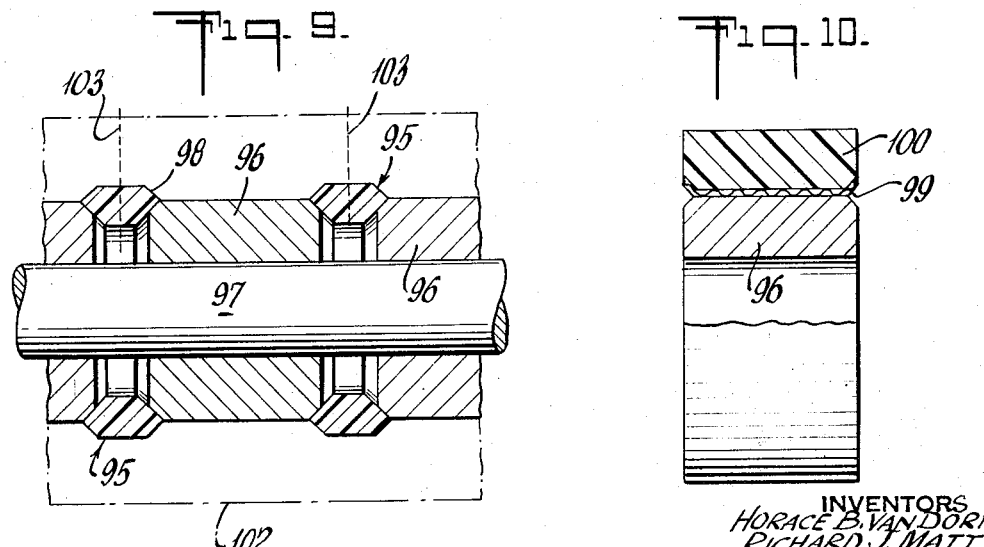

3,697,346
METHOD OF MAKING A COMPOSITE PLASTIC BEARING
Horace B. Van Dorn, Kensington, Richard J. Matt, Simsbury, and Thomas P. Rolland, Bristol, Conn., assignors to Textron Inc., Providence, R.I.
Filed Dec. 1, 1970, Ser. No. 93,945
Int. Cl. B21c *13/00;* B65h *81/08;* B21d *53/10*
U.S. Cl. 156—161                                    18 Claims

ABSTRACT OF THE DISCLOSURE

The invention contemplates an improved sliding bearing, and method of making the same, wherein a low-friction fabric liner of non-cylindrical shape is part of an outer-ring member which has a sliding rotational interface with the matching surface of inner bearing-ring member.

According to the method of the invention, plural inner bearing-ring members are first arrayed upon a common support or mandrel. A braided sock of low-friction fabric is slipped over the inner-ring members and is axially elongated to cause the main body of the sock to conform generally with the external contour of the arrayed inner rings. Hardenable plastic such as epoxy or phenolic is applied to impregnate the threads of the sock and to wet applied reinforcing threads of back-up layers, resulting in a single impregnated cylinder in which the liner material is held to the countour of all inner rings, for curing to ultimate hardness. Separate assembled bearings result from the radial cut-off between adjacent inner rings, and removal of the mandrel. Various further refining details are disclosed.

---

This invention relates to low-friction fabric-lined bearings and to methods of making the same. More specifically, the invention is concerned with such bearings involving sliding rotational surfaces at an interface, and in which the bearing interface is other than cylindrical.

Techniques are known for producing composite plastic bearings with low-friction fabric liners, and in journal-bearing applications of such bearings it is convenient to form the bearing on a cylindrical mandrel which can be removed, and then reused, to make more bearings. Such techniques are disclosed, for example, in Pat. No. 3,507,-022. However, such techniques do not lend themselves to manufacture of rotary bearings having a non-cylindrical interface, as for example a plain spherical bearing, wherein the interface is a truncated sphere, with the liner and its backing concaved and surrounding the convex spherical surface of a supporting inner ring or ball.

In the conventional construction of fabric-lined plain spherical bearings, as disclosed in Pat. No. 3,303,557 the liner is bonded to the bore of a deformable outer cylindrical ring; the spherical ball or inner ring is then inserted into the lined bore, and then the lined ring is swaged radially into "conformity" with the convex spherical surface. This method is relatively expensive in its requirement for metal in the outer ring, in its use of multiple materials, and in the fact that a lingering uncertainty must exist, to a degree, as to whether the low-friction liner surface has in fact continuously and uniformly conformed to the spherical liner ring.

It is, accordingly, an object to provide an improved bearing construction of the character indicated.

Another object is to provide a method of making such a bearing whereby there can be improved assurance of uniformity and fidelity of fit of the concave liner to the convex surface on which it rides.

A further object is to meet the above objects with a structure using less metal, and of inherently lower cost, than pre-existing bearings of comparable size.

A still further object is to provide an improved method of making such bearings, which method lends itself inherently to mass-production manufacture, with economy in the use of low-friction liner material.

A specific object is to provide a superior ball-joint or plain-spherical bearing construction, and to provide a method for making the same whereby quality of finished product may be held to substantially closer limits than heretofore and at reduced unit cost.

A further specific object is to provide a method and bearing construction of the character indicated, wherein fiber ends of liner material are assuredly kept away from the bearing interface.

Another object is to meet said specific objects with apparatus and a method lending themselves to selective manufacture of a plurality of different sizes and types of bearing.

Other objects and various further features of novelty and invention will be pointed out or will occur to those skilled in the art from a reading of the following specification in conjunction with the accompanying drawings. In said drawings, which show, for illustrative purposes only, preferred forms and methods:

FIG. 1 is a vertical sectional view of a bearing of the invention;

FIGS. 2, 3, and 4 are similar views in elevation to show progressive stages of building bearings in accordance with the invention;

FIG. 5 is a fragmentary sectional view to illustrate a detail in the method of the invention;

FIGS. 6 and 7 are views similar to FIG. 1 to illustrate other bearing configurations for which the method and apparatus of the invention are useful;

FIG. 8 is a simplified view in side elevation, partly broken-away and in longitudinal section, to illustrate a modified method;

FIG. 9 is an enlarged fragmentary vertical sectional view to illustrate application of the invention to journal-bearing production; and FIG. 10 is a similar view of the end product of the method of FIG. 9.

According to the invention, plural inner bearing ring members of non-cylindrical shape are first arrayed upon a common support or mandrel. A braided sock of low-friction fabric is slipped over the inner ring member and is axially elongated to cause the main body of the sock to conform generally with the external contour of the arrayed inner rings. Hardenable plastic such as an epoxy or a phenolic is applied to impregnate the threads of the sock and to wet applied reinforcing threads of back-up layers, resulting in a single impregnated cylinder in which the liner material is held to the contour of all inner rings, curing to ultimate hardness. Separate assembled bearings result from radial cut-off between adjacent inner rings and removal of the mandrel.

Referring to FIG. 1 of the drawings, the invention is shown in application to a plain spherical bearing comprising an inner ring 10 and an outer ring 11 having a sliding-fit relation, and a low friction liner 12 constituting the concave face of the outer ring 11. The interface between the rings 10–11 is over a spherical surface which for the inner ring 10 is the convex-spherical surface 13, and which for the outer ring 11 is the concave-spherical inner surface of the liner 12.

For the configuration shown, the inner ring 10, preferably of stainless steel, has a central bore 14 for fitting the same upon a shaft, and the axial ends 15–16 are truncated at parallel planes 15–16 on opposite sides of the central plane of symmetry of the ring 10. The outer ring 11 also has axial end faces 17–18, which are symmetrically positioned on opposite sides of the central plane of symmetry of the concave surface 12, but the overall axial extent of the outer ring 11 is less than that of the inner ring 10. The inner ring 10 may be of suitable steel, and preferably the surface 13 thereof is finished with high fidelity to a spherical contour. A suitable method for making such a surface on a member such as the inner ring 10 is disclosed in Atwater Pat. No. 3,299,583.

The outer ring 11 comprises the liner 12 and an annular body of back-up material which in the form shown is a cured plastic with wrapped reinforcing circumferential strands, filaments or threads, as of glass fiber. The cured impregnating plastic may be an epoxy or a phenolic, and the liner 12 may be a woven fabric or a braided fabric with low-friction threads or filaments and with bondable threads or filaments. The impregnation and curing to hardness adequately position low-friction fibers, and retaining bondable fibers, at the bearing interface.

Referring to FIGS. 2, 3, and 4, the method of making a bearing such as the bearing of FIG. 1 comprises prefabricating a plurality of inner bearing rings 10 and assembling the same in longitudinally nested array upon a suitable supporting mandrel 20. As shown, the mandrel 20 is substantially elongated and forms the reduced end of a bar 21 at a shoulder 22. To assemble the rings 10 to the mandrel 20, a disc, collar or washer 23 is first applied to the mandrel to effectively enlarge this shoulder 22. The rings 10 are then applied in interlaced relation with expendable spacer elements 24, beginning first with such a spacer element 24 adjacent to disc 23, followed by an inner bearing ring 10, the next spacer element 24, another ring 10, and so on, until the desired plurality of rings is assembled, within the carrying capacity of the mandrel. The terminal element applied to the mandrel is another such spacer element, and the assembly is completed and held in secure axial compression by a further washer or disc 25 and by a suitable clamp nut 26 to the threaded end 27 of the mandrel.

The spacer elements 24 may be of injection-molded plastic and, as indicated, are expendable. Preferably, they are symmetrical about their central planes of symmetry, being convergent in taper from the central plane of symmetry down towards their respective axial ends. They are shown to terminate with end faces substantially matching the radial extent of the end faces of the rings 10, which they abut. Since it is desired to conserve axial length along the mandrel 20, the spacer elements 24 are of relatively small axial extent compared to the rings 10, which they separate. Their radial extent is preferably substantially equal to the maximum radial extent of rings 10.

The radial extent of the end washers 23–25 is designated $R_0$ and is preferably equal to or slightly in excess of the ultimate build-up diameter of developing outer-ring bearing material on the mandrel, as will be more fully explained. The radius $R_1$ of build-up of outer-ring material on the mandrel is designated in FIG. 1 and is shown to exceed the ultimate radius $R_2$ of the finished outer ring 11, as will also be more fully explained.

Having thus assembled the inner-ring elements 10 to the supporting mandrel 20, the entire exposed irregular contour of the assembly between washers 23–25 should be coated with a parting agent, if necessary, to avoid bonding of the epoxy, phenolic, or other hardenable material thereto. The material of the liner 12 is then applied to this irregular contour, and FIG. 3 illustrates this step. The liner 12 may be a loosely woven fabric. It preferably has sufficient "give" to adapt with relative ease to the irregular contour of the assembly. The fabric may thus be a loomed fabric, cut and circumferentially wrapped at least once around the assembled mandrel so as to present biased weaves for contour conformance. Alternatively, and preferably, the liner 12 is applied as a braided fabric, where the helical advance of the braids is relied upon to provide the bias or contour-conforming property. The particular threads constituting the weave of the fabric will depend upon desired ultimate properties. We have found satisfactory results to be achieved when each thread of the braided fabric or sock is a mixture of Teflon* filaments and Nomex* filaments, twisted together in such proportion that the Teflon presented at the bearing interface is 50 percent or less of the total presented filaments. We prefer such a proportioning for the reasons that Nomex filaments have substantially greater tensile strength than those of Teflon, and Nomex filaments also have very superior bondable properties, coupled with sufficient self-lubricating properties as not materially to degrade the low-friction benefits of the Teflon. Additionally, Nomex filaments have the property of shrinking upon curing of the hardenable material; this shrink factor in Nomex filaments (e.g., in the order of 1 percent) may be adequate in some bearings, but we prefer to enhance the shrink action by addition of a relatively small number of more-shrinkable filaments (as of Dacron) to the indicated predominant mix of Nomex and Teflon. In any case, shrink action is relied upon to develop a circumferential tensioning, to compress and hold the Teflon threads or filaments firmly at the bearing interface and enables the non-Teflon threads at the bearing interface to perform a very effective Teflon-retaining function.

Thus, with the preferred use of a sock of braided fabric for the liner 12, a suitable length thereof is selected and axially compressed to radially expand the same and permit it to be inserted over the clamp end of the mandrel. Once over the end of the mandrel, the inner or left end of the sock may be suitably secured against the left-end washer 23, as by employing a rubber band, O-ring or the like 28 at the root or junction between the left-end conical surface of the left-end spacer 24 and the adjacent radial face of the washer 23. The rest of the sock 12 is then pulled to the right, and in the course of pulling it will radially compress and conform generally to the contour of spacers 24 and inner rings 10. At the far right end, the sock is cut off and secured, as by another rubber band or O-ring 29, adjacent to the right-end washer 25. Adequately uniform distribution of the sock material along the assembled mandrel can be achieved manually, by local spreading, as dictated by visual observation.

Having distributed the sock along the assembly, a layer of suitable hardenable material such as an epoxy or a phenolic is applied, the same being selected for its capability of wetting and bonding to the liner 12; this step can be performed by supporting the base end 21 of the mandrel in a lathe chuck, the sock being uniformly wetted, as by brushed application of the hardenable liquid, along the length of the assembly during the course of rotation.

According to an alternative technique, the sock is impregnated with the hardenable material prior to assembly over the inner rings and spacers. This may be done with the hardenable material in its A-stage (liquid-phase) or after partial curing to its B-stage (sock fabric still pliable, but dry). In either event, such procedure affords an accurate control of the amount of hardenable material in the sock, as by performing a controlled wring-out of excess liquid hardenable material from a soaked sock prior to its mandrel assembly or partial cure, as the case may be.

Having thus achieved an assembly of impregnated liner material 12 along the length of the assembled mandrel 20, all is in readiness to develop the surrounding back-up material for the outer ring 11. This may be achieved by using woven fabric of strong bondable fiber, such as glass fiber, cut and circumferentially wrapped on the bias, to permit maximum contour conformance to the indicated irregular profile, and such fabric may be wetted with bondable material as it is thus wrapped, for plural turns thereof; however, in the form shown in FIG. 4, backing is developed by helically wrapping plural strands of suitable rein-

---

*"Teflon" and "Nomex" are trademarks of the E. I. du Pont de Nemours Company for their tetrafluoroethylene products and for their high temperature-resistant nylon products, respectively.

forcing threads or filaments, as of glass fiber, all in the manner described in greater detail in the copending Matt et al. application filed on even date herewith, Ser. No. 94,091. It suffices for present purposes to identify an elongated guide or rod 30 in which is supported a plurality of spools or reels 41–42–43–44 from which the respective filaments are paid out, through suitable guide means 45, for simultaneous application in a closely spaced cluster 46 as a circumferential wrap of the wetted fabric 12. In FIG. 4, the wrap of such reinforcing threads has begun at the left-end disc or washer 23; it has proceeded over the first spacer 24 and has just passed the middle of the first inner ring 10. The wrapping proceeds in a preferably uniform longitudinally oscillating traverse of the entire assembled mandrel. As the wrap proceeds, the outer periphery of the developing mass is preferably continuously wetted with the hardenable material, such as the epoxy or the phenolic in its liquid phase.

In due course, the outer profile grows in extent, first, to the point designated 47 where all peaks of spacers and inner rings 10 have been substantially embedded and then to the final outer radius $R_1$, already identified as the maximum extent of the wrap development. The outer profile of this development can only be said to approximate a true cylinder, coaxial with the central axis 49 of the mandrel; therefore, the radius $R_1$ should be built sufficiently in excess of the desired ultimate outer-ring radius $R_2$ to permit finishing the same without voids and to true concentricity with the axis 49.

Having developed the wrapup of reinforcing and reinforced back-up material, the loaded mandrel is placed in an oven or other environment appropriate to the impregnating material, and curing to ultimate hardness is caused to take place. As previously noted, such curing, as in the case of impregnating with epoxies, will cause the bondable fibers, such as Nomex, to tense and to assure correct and efficient positioning of Teflon at the bearing interface. The parting agent, of course, assures that there will be no bonding to the inner rings 10, and, as previously noted, the spacers 24 are expendable so that bonding to them is of no consequence.

After curing, the external contour 48 of the hard assembly is turned and finished to the desired ultimate radius $R_2$, after first removing the clamp nut 26 and the end washer 25. Radial cut-off and end-facing lathe operations are made, starting at the right, and indexing left to the next spacer 24, for each cut-off assembly; alternatively the end-facing operations, to finish the respective end faces 17–18 of the outer ring 11, may be separately performed after cut-off. Thus, with each such cut-off, another fully assembled plain-spherical bearing, as shown in FIG. 1 may become available, merely by slipping off the unclamped end of the mandrel. Alternatively, the entire cured mass may be removed from the mandrel, the cut-off operation may be a saw cut, and the finishing operations may be performed in separately chucked apparatus.

FIG. 5 illustrates a modification wherein the spacer elements 50 between inner rings 10 on the mandrel 20 are again expendable but are formed with counterbores to seat upon small adjacent end regions of adjacent convex spherical surfaces of rings 10, reliance being had upon axial-clamping action by nut 26 to assure a tight seating fit of these expendable spacers 50 to the adjacent rings 10. The outer contours 51 of spacers 50 are shown to be generally cylindrical and to be terminated by bevels, as at 52–53, which may be at substantially 45 degrees to the axis of mandrel 20. The size and placement of bevels 52–53, adjacent to the spherical surfaces of the inner rings 10 upon which they sit, are such that they can define chamfer surfaces in the ultimate outer ring 11 which develops from these surfaces. The liner material 12 is applied as previously described and, of course, conforms to the local contour irregularity of (a) the outer spherical surfaces of rings 10 and (b) the outer bevels and cylindrical surfaces 51–52–53 of the expendable spacers 50. The reinforcing back-up material is applied, impregnated and built-up in the manner already described in connection with FIGS. 2 to 4.

After curing of the assembled and built-up mandrel to ultimate hardness, the separate finished bearings are obtained by radially inward cut-off, as at the saw-path alignments suggested at 54–55, and the end faces of the outer rings 11 for each inner ring 10 are developed as finished cuts, as, for example, at the plane 56 shown in FIG. 5. The plane 56 is axially positioned to enable a cutting tool to progress radially inward, through the body of the reinforced plastic backing material, and into at least partial damaging contact with the expendable spacer ring 50. However, the radially inward cut is terminated prior to any possible contact with the outer spherical surface of the inner ring 10. Having thus finished and parted the respective bearing assemblies 10–11, it is a simple matter to remove such small remaining fragment of the expendable spacer 50 as may still be retained at the beveled part 52. Since the spacer 50 and the rings 10 were initially coated with the parting agent, it is also a simple matter to remove any fragment of the bevel 52 without damage to the spherical surface of the inner ring 10. There thus results a bearing assembly in which the chamfer regions at the axial ends of the concave lined spherical surface of the outer ring 10 are smooth and free of any end of fabric material. This avoids the presentation of frayed ends of fabric material at the bearing interface, as will be understood.

FIG. 6 illustrates that the invention may be applied with equal facility to other forms of irregular or non-cylindrical bearing interfaces. For example, in FIG. 6, the inner ring 65, which may be of steel, includes a bore 66 and an outer conical surface 67 which is to determine the region of sliding bearing action. According to the method of the invention, plural rings such as the ring 65 are assembled on the mandrel 20 in conjunction with suitable spacers, not shown, of expendable material. The liner sock 68 is then applied over the exposed irregular contour of the loaded mandrel, and the back-up material wrapping, impregnation, and curing proceed as already described. Individual, fully assembled bearings are available by lathe-turning, cut-off, and facing operations, as already described. It will be understood that the expendable spacers used in conjunction with a structure as in FIG. 6 may be provided with end bevels, as at 52–53, to enable the finished outer ring 69 to be characterized by end chamfers for its liner surface.

FIG. 7 similarly illustrates further flexibility in the use of the method of the invention. In FIG. 7, an inner ring 70 has a bore 71 for mounting purposes, and its external configuration is generally cylindrical at 72 between reduced ends or shoulders 73 that are set inwardly from the axial end of the inner ring 70. Spacers and the liner 74 of low-friction material are applied as previously described, followed by development of the reinforced back-up material to hold the liner material firmly against the inner ring 70. After curing to hardness, cut-off, facing and other finishing operations, there results an outer ring 75, characterized by a substantial radial-load sustaining capability, coupled with a degree of bi-directional axial-thrust sustaining capability at the radially inward flanges 76–77, which characterize the ends of the outer ring 75. It will be understood that the configuration of FIG. 7 is purely illustrative and that it, among other things, illustrates applicability of the invention to the blind formation of combined radial-and-thrust sustaining bearings, including for example, those which have merely a single radial-flange interface and a single cylindrical interface to sustain radial loads in the further circumstance of primarily unidirectional thrust.

FIG. 8 illustrates a modification of the invention in which no mandrel is required, and yet in which plural plain-spherical bearings are produced in unison. Expendable spacers 80 are assembled between adjacent inner-ring members 10, in longitudinally extending array. These spacers may be injection-molded rings of suitable plastic, having central bores which are chamfered or concave-spherically counterbored for circumferentially continuous supporting contact with adjacent end portions of the convex-spherical surfaces of inner-ring members 10. The external contour of the rings 80 is not critical and may be as previously described for certain other spacers, being preferably characterized by opposed end bevels 81, for chamfer generation in the ultimately formed outer ring member 11, as will be understood.

The method of FIG. 8 is preferably performed in a lathe or the like machine comprising a frame 82, a fixed upstanding head stock 83 with revoluble chuck means 84 on a drive shaft 85, and a tailstock 86 with manual means 87 for adjustably longitudinally positioning a rotatable "center" or work support 88. A driven work support 89 is held in chuck means 84; support 89 has a convex spherical surface 90 to engage a first expendable spacer 80, and support 88 is similarly equipped to engage a final spacer 80 at the other end.

Manual means 87 is first backed off sufficiently to accommodate the desired assembly. A liner sock 12 (not shown in FIG. 8) is selected for appropriate stretchable length and is compressed (and necessarily also radially expanded) against the work support 89; the left end of the sock may be tucked in and around the left rim of the first spacer 80 before the latter's assembly to support 89, to permit squeezed retention of its left end, or the previously described rubber-band technique may be used. Thereafter, inner rings 10 and spacers 80 are assembled in alternation, to the desired extent; whereupon, the last spacer 80 is applied, and manual means 87 is set to clamp the assembly. Clamping may pinch the right end of the sock at 80–88, as described for 80–89 at the left end, or the rubber-band technique may be used. The sock is smoothed out for its length, wound with backing, impregnated and cured as previously described. The final built-up and cured mass has the general outline 91 and may be removed by backing off the means 87. For more continuous use of the lathe, a suitable clamp structure (not shown) may axially retain the built-up assembly 91 to permit removal from the lathe for curing, while proceeding to build a next assembly 91. Since the outer surface of each ring 10 is spherical, strict axis alignment for each ring is not critical, as long as spacers 80 have circumferentially continuous contact with rings 10; for example, a tolerable misalignment α is indicated for one of the rings 10.

FIGS. 9 and 10 illustrate application of the method to production of plural journal bearings, using expendable spacers 95 having concave chamfered edges to seat upon convex chamfered edges of plural inner bearing rings 96, in clamped longitudinal array along a mandrel 97. The outer end edges 98 of the spacers 96 are convex-chamfered, so that a liner 12 can be readily conformed to a profile which assures that fiber ends will line the chamfer 99 of the bore of the ultimate outer-bearing ring 100 and, therefore, will not be present at the bearing interface. Building and finishing of the outer bearing-ring body to the limit 102 may be as described for the plain-spherical bearings, the individual bearings being severed at alignments 103 and finished to end faces which leave the chamfers 99, after all remaining material of spacers 98 has been removed.

It will be seen that the described invention achieves the objects set forth above and provides bearings which unquestionably have substantial low friction material at the bearing interface and without any voids at the bearing interface. Additionally, the method of applying the backing material assures that tensed strands of reinforcement filament radially inwardly force the liner fabric into strict conformance with all surface irregularities in the mandrel, as loaded with inner rings and spacers. Thus, chamfered regions and junctures between radial and axial surfaces are faithfully followed and supported with low-friction material. Nothing in the finishing operation disturbs the fully mated and compressionally stressed reinforcement of the back-up material in the lined outer ring. Thus, all assembled bearings which are the product of the present method of manufacture are found to have a remarkable degree of conformance with each other and specifications can be held with minimum wastage of product.

Through our techniques, cost of fabrication is reduced, and bearing life and capacity are increased, for any given size. Economies are realized by eliminating the need for metal-deforming tools, and by being able to use the same size braided liner tubing for a range of bearing-interface sizes.

While the invention has been described in detail for the preferred forms shown, it will be understood that modifications may be made without departing from the invention.

What is claimed is:

1. The method of making a plain spherical bearing having rotatable inner and outer ring members with a spherical sliding interface, which comprises selecting an inner-ring member with an outer convex spherical surface characterized by a bearing portion thereof that is circumferentially continuous about a central axis, circumferentially enveloping said surface with a flexible low-friction fabric, said fabric being circumferentially continuously wetted with a hardenable material in its liquid state, helically enwrapping the wetted fabric with strands of a reinforcing material to which said hardenable material is bondable, wetting the reinforcing material with liquid hardenable material, whereby fibers of the fabric and of the reinforcing material are embedded in hardenable material, curing the hardenable material to ultimate hardness, and finishing the hardened mass to desired external contour.

2. The method of claim 1 in which the fabric is wetted with hardenable material prior to assembly to said spherical surface.

3. The method of claim 1, in which the fabric is wetted with hardenable material after assembly to said spherical surface.

4. The method of claim 1, in which the helical wrapping is under tension of such magnitude as to enforce conformance of said fabric to the spherical surface of said inner-ring member.

5. The method of making a plurality of plain spherical bearings each having rotatable inner and outer members with a spherical sliding interface, which comprises assembling a plurality of such inner members in longitudinally aligned array, whereby the external contour of the assembly is characterized by plural spaced spherical surfaces, circumferentially enveloping said contour with a flexible low-friction fabric, enwrapping the fabric with helical strands of a reinforcing material to which hardenable-liquid bonding material is bondable, said wrapped strands and fabric being impregnated with said material, whereby fibers of the fabric and of the reinforcing material are embedded in hardenable material, curing the hardenable material to ultimate hardness, and severing separate bearings by radial-plane cutting of the hardened mass at substantially bearing-unit intervals.

6. The method of claim 5, in which the fabric is woven and is bias-oriented in its circumferential wrap of said spherical surface.

7. The method of claim 5, in which the fabric is cut from a length of a braided tubing and is longitudinally elongated to achieve conformance with said surface.

8. The method of claim 5, including the further step of selecting and assembling a spacer between adjacent inner members in said array.

9. The method of claim 8, in which the selected spacer has longitudinally opposed concave surfaces having circumferentially continuous supporting contact with an end portion of the convex spherical inner-member surface adjacent thereto, and in which the radial plane of the cutting step is intermediate the spaced regions of spacer contact between adjacent members.

10. The method of claim 9, in which said spacer has convex bevels at its longitudinal ends, and in which the cut-off bearing is finished to an end face at a radial plane which intersects one of said bevels, the remainder of the cut bevel being removed to expose a lined chamfered end of the concave spherical surface of the outer bearing ring.

11. The method of making a plurality of plain spherical bearings each having rotatable inner and outer ring members with a spherical sliding interface, and the inner-ring member having a cylindrical mounting bore, which comprises selecting an elongated cylindrical mandrel of size to fit and concentrically support the inner-ring bore assembling a plurality of such inner-ring members to the mandrel in longitudinally aligned array, whereby the external contour of the mandrel is characterized by plural spaced spherical surfaces, circumferentially enveloping said contour with a flexible low-friction fabric, helically enwrapping the fabric with strands of a reinforcing material to which hardenable-liquid bonding material is bondable, said wrapped strands and fabric being impregnated with said material, whereby fibers of the fabric and of the reinforcing material are embedded in hardenable material, curing the hardenable material to ultimate hardness, finishing the hardened mass to desired external contour, and severing separate plain-spherical bearings by radial-plane cutting of the hardened mass at substantially bearing-unit intervals.

12. The method of claim 11, in which the mandrel is removed prior to said cutting step.

13. The method of claim 11, in which said cutting step is performed with the mandrel in place, whereby successive bearings may be severed in a lathe operation in which the mandrel is chucked.

14. The method of making a plurality of bearings each having relatively rotatable inner and outer members in engagement at a sliding interface which is a surface of revolution about an axis of rotation, which comprises adjacently assembling a plurality of such inner members with their axes in longitudinally aligned array, whereby the external contour of the assembly is characterized by a succession of the convex surfaces of said inner members, circumferentially enveloping said contour with a flexible low-friction fabric, helically enwrapping the fabric with strands of a reinforcing material to which hardenable-liquid bonding material is bondable, said wrapped strands and fabric being impregnated with said material, whereby fibers of the fabric and of the reinforcing material are embedded in hardenable material, curing the hardenable material to ultimate hardness, and severing separate bearings by radial-plane cutting of the hardened mass at substantially bearing-unit intervals.

15. The method of claim 14, in which said sliding interface is conical.

16. The method of claim 14, in which said sliding interface includes substantially radially extending and substantially cylindrical elements.

17. The method of claim 14, in which a parting agent is applied to said contour prior to fabric application thereto.

18. The method of claim 14, in which the fabric is woven and is bias-oriented in its circumferential envelopment of said contour.

References Cited
UNITED STATES PATENTS

| | | | |
|---|---|---|---|
| 2,958,927 | 11/1960 | Kravats | 29—149.5 |
| 3,507,023 | 4/1970 | Matt et al. | 29—149.5 |
| 3,386,872 | 6/1968 | Medney | 156—173 |
| 3,507,022 | 4/1970 | Conru | 29—149.5 |
| 3,458,374 | 7/1969 | Shobert | 308—238 |
| 3,231,299 | 1/1966 | Birney et al. | 308—72 |

DANIEL J. FRITSCH, Primary Examiner

U.S. Cl. X.R.

29—149.5 NM; 156—162, 170, 172, 173; 308—72, 238

Notice of Adverse Decision in Interference

In Interference No. 98,178 involving Patent No. 3,697,346, H. B. Van Dorn, R. J. Matt and T. P. Rolland, METHOD OF MAKING A COMPOSITE PLASTIC BEARING, final judgment adverse to the patentees was rendered Nov 28, 1975, as to claims 1, 3, 4, 5, 11, 12, 14 and 17.

[*Official Gazette March 23, 1976.*]

Disclaimer 3,697,346.—*Horace B. Van Dorn*, Kensington, *Richard J. Matt*, Simsbury, and *Thomas P. Rolland*, Bristol, Conn. METHOD OF MAKING A COMPOSITE PLASTIC BEARING. Patent dated Oct. 10, 1972. Disclaimer filed Oct. 18, 1976, by the assignee, *Textron Inc.*

Hereby enters this disclaimer to claims 1, 3, 4, 5, 11, 12, 14 and 17 of said patent.

[*Official Gazette January 11, 1977.*]